United States Patent Office 3,084,155
Patented Apr. 2, 1963

3,084,155
DERIVATIVES OF DIBENZO[b,e]AZEPINES
Stanley O. Winthrop and Martin A. Davis, both of Montreal, Quebec, Canada, assignors to American Home Products Corporation, New York, N.Y., a corporation of Delaware
No Drawing. Filed Dec. 4, 1961, Ser. No. 156,919
4 Claims. (Cl. 260—239.3)

This invention relates to new chemical compounds, derivatives of dibenzo[b,e]azepines, and to their preparation from available starting materials.

More particularly, our invention relates to the compound 11-(3'-dimethylaminopropyl)-6-keto-5,6-dihydrodibenzo[b,e]azepine, to its acid addition salts, particularly its hydrohalide salts, and to the preparation of these new chemical compounds from available starting materials.

These compounds are useful as tranquilizers and antidepressant drugs. Their pharmacological activity is that characteristic of those agents which are now used as antidepressants and for their tranquillizing action.

In preparing the new chemical compounds we prefer to utilize as starting material the compound 6,11-diketo-5,6-dihydrodibenzo[b,e]azepine, a known compound described, for example, in Gazz. Chim. Ital., vol 83, page 533 (1953). See also Chemical Abstracts, vol. 49, page 1068 (1955).

The compound 6,11-diketo-5,6-dihydrodibenzo[b,e]azepine is first reacted with a dimethylaminopropyl chloride Grignard reagent. This reaction is preferably carried out in an inert solvent and at an elevated temperature such as the temperature of reflux. Hydrolysis of the Grignard complex, followed by extraction with an organic solvent, results in the alcohol, the compound 11-hydroxy-11-(3'-dimethylaminopropyl)-6-keto-5,6-dihydrodibenzo[b,e]azepine, which may be purified by recrystallization from an organic solvent.

This alcohol is then reacted with hydriodic acid and red phosphorus. The reaction is preferably carried out in glacial acetic acid and at an elevated temperature. This results in the hydriodide salt of the desired end product. This may be recovered as such, or it may be taken up in an organic solvent and treated with an aqueous solution of an alkali.

The organic layer separates and may be dried over a drying agent, such as sodium sulfate. Evaporation of the solvent results in the free base, i.e. 11-(3'-dimethylaminopropyl)-6-keto-5,6-dihydrodibenzo[b,e]azepine. It may be purified by recrystallization from a suitable organic solvent or from a mixed solvent.

Acid addition salt of the base may be prepared by treating the base, preferably in an organic solvent solution, with the acid. In this way the hydrohalideacid addition salts are readily prepared. They may then be recovered in the usual manner, as by crystallization and recrystallization from a suitable solvent.

The chemical reactions occurring may be represented schematically as follows:

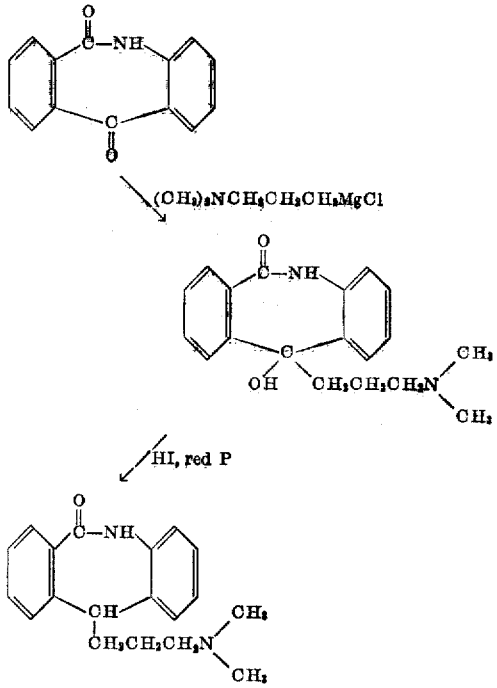

Further details of our process for the preparation of these new chemical compounds, exhibiting a spectrum of pharmacological activities characteristic of tranquilizers and anti-depresent drugs, will be found in the illustrative examples which follow.

EXAMPLE 1

*11-Hydroxy-11-(3'-Dimethylaminopropyl)-6-Keto-5,6-Dihydrodibenzo[b,e]azepine*

Dimethylaminopropyl magnesium chloride prepared from magnesium (10.7 grams, 0.468 mole) and dimethylaminopropylchloride (56.5 grams, 0.468 mole) in 160 ml. of tetrahydrofuran, was added dropwise to 6,11-diketo-5,6-dihydrodibenzo[b,e]azepine (34 grams, 0.15 mole) in 3 litres of toluene at reflux temperature. The addition was completed in one hour and heating was continued for an additional eighteen hours. The reaction mixture was cooled and shaken with 2½ litres of aqueous ammonium chloride. The aqueous layer was then further extracted with ether and the combined organic layers washed with water. The organic extracts were then dried and evaporated down to yield 30 grams of crude product; M.P. 150–163° C. This product was 11-hydroxy-11-(3'-dimethylaminopropyl) - 6 - keto-5,6-dihydrodibenzo[b,e] azepine. One recrystallization from acetone gave 20 grams of product, of M.P. 188–189° C., which was analytically pure.

Analysis confirmed the empiric formula $C_{19}H_{22}N_2O_2$. Required: C, 73.52 percent; H, 7.14 percent; N, 9.02 percent. Found: C, 73.58 percent; H, 7.14 percent; N, 9.29 percent.

EXAMPLE 2

*11-(3'-Dimethylaminopropyl)-6-keto-5,6-dihydrodibenzo[b,e]azepine*

The alcohol as prepared in Example 1 (10 grams, 0.0325 mole) was dissolved in 120 mls. of glacial acetic acid containing 53 mls. of 56% hydriodic acid and 10 grams of red phosphorus. The reaction mixture was stirred and heated at reflux for twenty hours. The insoluble material was then removed by filtration and the filtrate evaporated down in vacuo, i.e. at a pressure less than atmospheric, leaving the crude product, the hydroiodide, as an oily residue. This was taken up in 400 mls. of ethylenedichloride and washed with 150 mls. of 5% sodium hydroxide and then with water. The organic layer was dried over sodium sulphate and evaporated down to yield 8 grams of the product, 11-(3'-dimethylaminopropyl)-6-keto-5,6-dihydrodibenzo[b,e]azepine, as an oily residue. This free base crystallized on trituration with acetone to give a solid of M.P. 125–130° C. Two recrystallizations from acetone-ether gave an analytical sample of the free base; M.P. 131–133° C.

Analysis confirmed the empiric formula $C_{19}H_{22}N_2O_2$. Required: C, 77.52; H, 7.53; N, 9.52. Found: C, 76.85; H, 7.45; N, 9.60.

EXAMPLE 3

*Acid Addition Salts*

The free base, as prepared in Example 2, was dissolved in ether and hydrogen chloride gas was bubbled in, causing the hydrochloride salt to precipitate as a gum. This was crystallized from isopropanol to yield 4.2 grams of solid of M.P. 214–216° C. Two recrystallizations from acetonitrile raised the melting point to 220–222° C.

Analysis confirmed the empiric formula $C_{19}H_{23}N_2OCl$ for the hydrochloride salt of 11-(3'-dimethylaminopropyl)-6-keto-5,6-dihydrobenzo[b,e]azepine. Required: N, 8.47; Cl, 10.71. Found: N, 8.79; Cl, 10.49.

The product was also characterized as its hydroiodide salt. A sample of the original oil residue from the hydroiodic acid reduction (Example 2) was crystallized from acetone-methanol to give a solid hydroiodide salt of the base, 11-(3'-dimethylaminopropyl)-6-keto-5,6-dihydrodibenzo[b,e]azepine, with M.P. 232–234° C. A second recrystallization from acetone-methanol did not change the melting point.

Analysis confirmed the empiric formula $C_{19}H_{23}N_2OI$ for the hydroiodide salt. Required: N, 6.64; Cl, 30.08. Found: N, 6.55; I, 30.22.

We claim:
1. A compound selected from the group which consists of 11-(3'-dimethylaminopropyl)-6-keto-5,6-dihydrodibenzo[b,e]azepine and its acid addition salts with hydrohalic acids.
2. 11 - (3'-dimethylaminopropyl)-6-keto-5,6-dihydrodibenzo[b,e]azepine.
3. The hydrochloride salt of 11-(3'-dimethylaminopropyl)-6-keto-5,6-dihydrodibenzo[b,e]azepine.
4. The hydroiodide salt of 11-(3'-dimethylaminopropyl)-6-keto-5,6-dihydrobenzo[b,e]azepine.

References Cited in the file of this patent

UNITED STATES PATENTS

| | | |
|---|---|---|
| 2,951,082 | Sprague et al. | Aug. 30, 1960 |

FOREIGN PATENTS

| | | |
|---|---|---|
| 696,540 | Great Britain | Sept. 2, 1953 |
| 1,216,631 | France | Nov. 30, 1959 |

UNITED STATES PATENT OFFICE
CERTIFICATE OF CORRECTION

Patent No. 3,084,155                          April 2, 1963

Stanley O. Winthrop et al.

It is hereby certified that error appears in the above numbered patent requiring correction and that the said Letters Patent should read as corrected below.

Column 2, line 60, for "N. 9.02" read -- N, 9.02 --; column 4, lines 3 and 27, for "dihydrobenzo", each occurrence, read -- dihydrodibenzo --.

Signed and sealed this 22nd day of October 1963.

(SEAL)
Attest:

ERNEST W. SWIDER
Attesting Officer

EDWIN L. REYNOLDS

Acting Commissioner of Patents